(12) United States Patent
Kim et al.

(10) Patent No.: US 12,022,186 B2
(45) Date of Patent: Jun. 25, 2024

(54) CAMERA FOR VEHICLE

(71) Applicant: Samsung Electro-Mechanics Co., Ltd., Suwon-si (KR)

(72) Inventors: Tae Hoon Kim, Suwon-si (KR); Joon Seok Chae, Suwon-si (KR); Yun Tae Lee, Suwon-si (KR); Tae Kon Koo, Suwon-si (KR); Jae Chan Lee, Suwon-si (KR); Yong Woon Park, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 230 days.

(21) Appl. No.: 17/076,041

(22) Filed: Oct. 21, 2020

(65) Prior Publication Data

US 2021/0297609 A1 Sep. 23, 2021

(30) Foreign Application Priority Data

Mar. 23, 2020 (KR) ........................ 10-2020-0034853

(51) Int. Cl.
*H04N 23/65* (2023.01)
*G07C 5/08* (2006.01)
(Continued)

(52) U.S. Cl.
CPC ............. *H04N 23/651* (2023.01); *B60R 1/28* (2022.01); *G07C 5/0808* (2013.01); *H04N 23/65* (2023.01); *H04N 25/443* (2023.01); *H04N 25/57* (2023.01); *B60R 2300/30* (2013.01); *B60R 2300/302* (2013.01); *B60R 2300/306* (2013.01); *H04N 25/63* (2023.01)

(58) Field of Classification Search
CPC ....... B60R 2300/302; B60R 1/28; B60R 1/20; B60R 1/22; H04N 5/23241; H04N 5/232411; H04N 25/40; H04N 25/44
See application file for complete search history.

(56) References Cited

U.S. PATENT DOCUMENTS 10,893,183 B1 * 1/2021 Zou .................... B60R 11/04
2004/0109060 A1 * 6/2004 Ishii ...................... H04N 25/44
348/148

(Continued)

FOREIGN PATENT DOCUMENTS

EP 3409541 B1 * 10/2019 ............... B60R 1/00
JP 2009-205386 A 9/2009
(Continued)

OTHER PUBLICATIONS

S.T. Kim and D.N. Werner, "A Consumer-Oriented Automotive Diagnostic Scanner", University of Illinois (May 3, 2005) (Year: 2005).*

(Continued)

*Primary Examiner* — David N Werner
(74) *Attorney, Agent, or Firm* — NSIP Law

(57) ABSTRACT

A camera for a vehicle includes: an imaging unit configured to image an exterior of the vehicle; and a controller configured to enlarge a region of interest of the imaging unit in response to a driving speed of the vehicle being higher than a reference speed, and reduce the region of interest of the imaging unit in response to the driving speed being lower than the reference speed.

19 Claims, 3 Drawing Sheets

(51) Int. Cl.
  *B60R 1/28*       (2022.01)
  *H04N 25/57*      (2023.01)
  *H04N 25/443*     (2023.01)
  *H04N 25/63*      (2023.01)

(56) References Cited

U.S. PATENT DOCUMENTS

| | | | | |
|---|---|---|---|---|
| 2005/0206510 | A1* | 9/2005 | Weber | B60R 1/00 |
| | | | | 348/148 |
| 2008/0007428 | A1* | 1/2008 | Watanabe | G08G 1/166 |
| | | | | 340/901 |
| 2008/0049106 | A1* | 2/2008 | Kallhammer | B60R 1/00 |
| | | | | 348/E5.09 |
| 2008/0180527 | A1* | 7/2008 | Nixdorf | B60R 1/00 |
| | | | | 348/148 |
| 2010/0231715 | A1* | 9/2010 | Garner | B60R 1/00 |
| | | | | 348/148 |
| 2011/0115913 | A1* | 5/2011 | Lang | B60R 1/00 |
| | | | | 348/148 |
| 2014/0139669 | A1* | 5/2014 | Petrillo | B60R 1/00 |
| | | | | 348/148 |
| 2014/0267727 | A1* | 9/2014 | Alaniz | H04N 7/183 |
| | | | | 348/148 |
| 2017/0106797 | A1* | 4/2017 | Okohira | G08G 1/166 |
| 2017/0163863 | A1* | 6/2017 | Gomez Timoneda | |
| | | | | H04N 7/183 |
| 2017/0267178 | A1* | 9/2017 | Shiga | H04N 25/704 |
| 2019/0031161 | A1* | 1/2019 | Ji | B60Q 9/008 |
| 2019/0052828 | A1* | 2/2019 | Kajiwara | H04N 25/46 |
| 2019/0058842 | A1* | 2/2019 | Totsuka | H04N 25/702 |
| 2019/0124277 | A1* | 4/2019 | Mabuchi | H04N 25/50 |
| 2021/0152732 | A1* | 5/2021 | Eki | G06V 10/22 |
| 2023/0135043 | A1* | 5/2023 | Aoki | G01S 17/08 |
| | | | | 348/148 |

FOREIGN PATENT DOCUMENTS

| | | | | |
|---|---|---|---|---|
| JP | 2010-173366 A | | 8/2010 | |
| KR | 10-2012-0126152 A | | 11/2012 | |
| KR | 10-2013-0017497 A | | 2/2013 | |
| KR | 10-1827707 B1 | | 3/2018 | |
| WO | WO-2009036848 A2 | * | 3/2009 | B60R 1/00 |
| WO | WO-2020027233 A1 | * | 2/2020 | A61B 1/043 |
| WO | WO-2020090512 A1 | * | 5/2020 | B60R 1/00 |

OTHER PUBLICATIONS

Korean Office Action dated Mar. 5, 2021 in counterpart Korean Patent Application No. 10-2020-0034853 (6 pages in English)(5 pages in Korean).

* cited by examiner

CAMERA FOR VEHICLE

CROSS-REFERENCE TO RELATED APPLICATIONS

This application claims the benefit under 35 U.S.C. § 119(a) of Korean Patent Application No. 10-2020-0034853 filed on Mar. 23, 2020 in the Korean Intellectual Property Office, the entire disclosure of which is incorporated herein by reference for all purposes.

BACKGROUND

1. Field

The following description relates to a camera for a vehicle.

2. Description of Related Art

Multiple cameras have been mounted on a vehicle to prevent an accident occurring due to a blind spot in the course of driving and parking the vehicle. Examples of such cameras include: a front camera for recognizing an environment and situation of a road, other vehicles, and the like, in a forward direction of the vehicle, when driving; various sensing cameras for detecting an environment surrounding the vehicle, such as in left, right, and rear directions of the vehicle; and a plurality of top view cameras for providing an image of the vehicle viewed in a downward direction from a point in space above the vehicle, when parking the vehicle. In addition, a plurality of side view cameras have been mounted on a vehicle to replace side mirrors, which are susceptible to wind resistance during driving, and are susceptible to external shocks. Furthermore, autonomous vehicles have been developed to reduce traffic accidents and support mobility efficiency and mobility convenience. Such autonomous vehicles are expected to be equipped with a number of cameras, in addition to top view cameras and the side view cameras.

A camera to be mounted on an external surface of a vehicle may easily deviate from a normal operating temperature due to a temperature of the vehicle itself, external direct sunlight, or the like. When a temperature of the camera deviates from the normal operating temperature, especially when a temperature of the camera is higher than the normal operating temperature, there may be a problem that a dark current of an image sensor increases and deteriorates an image captured by the camera.

Therefore, it is desirable to appropriately control a camera, depending on driving situation of the vehicle, to reduce heat generation of the camera.

SUMMARY

This Summary is provided to introduce a selection of concepts in simplified form that are further described below in the Detailed Description. This Summary is not intended to identify key features or essential features of the claimed subject matter, nor is it intended to be used as an aid in determining the scope of the claimed subject matter.

In one general aspect, a camera for a vehicle includes: an imaging unit configured to image an exterior of the vehicle; and a controller configured to enlarge a region of interest of the imaging unit in response to a driving speed of the vehicle being higher than a reference speed, and reduce the region of interest of the imaging unit in response to the driving speed being lower than the reference speed.

The controller may be further configured to receive information on driving of the vehicle, including the driving speed, from an electronic control unit of the vehicle.

The controller may be further configured to activate a portion of pixels of an image sensor in the imaging unit, and deactivate a remaining portion of the pixels, depending on the driving speed.

A number of pixels in the deactivated remaining portion of the pixels when the driving speed is higher than the reference speed may be less than the number of pixels in the deactivated remaining portion of the pixels when the driving speed is lower than the reference speed.

A resolution of the deactivated remaining portion of the pixels may be lower than a resolution of the activated portion of the pixels.

The controller may be further configured to activate a portion of pixels of an image sensor in the imaging unit, and deactivate a remaining portion of the pixels, depending on an adjacent distance between the vehicle and an object adjacent to the vehicle.

A number of pixels in the deactivated remaining portion of the pixels when the adjacent distance is shorter than a reference distance may be less than the number of pixels in the deactivated remaining portion of the pixels when the adjacent distance is longer than the reference distance.

The controller may be further configured to increase a frame rate of the imaging unit in response to the driving speed being higher than a reference speed, and reduce the frame rate of the imaging unit in response to the driving speed being lower than the reference speed.

The controller may be further configured to be connected to an electronic control unit of the vehicle through an on-board diagnostics port of the vehicle.

In another general aspect, a camera for a vehicle includes: an imaging unit configured to image an exterior of the vehicle; and a controller configured to increase a dynamic range of the imaging unit in response to a driving speed of the vehicle being higher than a reference speed, and reduce the dynamic range of the imaging unit in response to the driving speed being lower than the reference speed.

The controller may be further configured to receive information on driving of the vehicle, including the driving speed, from an electronic control unit of the vehicle.

The controller may be further configured to activate a portion of pixels of an image sensor in the imaging unit, and deactivate a remaining portion of the pixels, depending on the driving speed.

A number of pixels in the deactivated remaining portion of the pixels when the driving speed may be higher than the reference speed is less than the number of pixels in the deactivated remaining portion of the pixels when the driving speed is lower than the reference speed.

A resolution of the deactivated remaining portion of the pixels may be lower than a resolution of the activated portion of the pixels.

The controller may be further configured to activate a portion of pixels of an image sensor in the imaging unit, and deactivate a remaining portion of the pixels, depending on an adjacent distance between the vehicle and an object adjacent to the vehicle.

A number of pixels in the deactivated portion of the pixels when the adjacent distance is shorter than a reference distance may be less than the number of pixels in the deactivated portion of the pixels when the adjacent distance is longer than the reference distance.

The controller may be further configured to increase a frame rate of the imaging unit in response to the driving speed being higher than a reference speed, and reduce the frame rate of the imaging unit in response to the driving speed being lower than the reference speed.

The controller may be further configured to be connected to an electronic control unit of the vehicle through an on-board diagnostics port of the vehicle.

In another general aspect, a control apparatus includes one or more processors. The one or more processors are configured to: receive a sensed driving speed of a vehicle; compare the sensed driving speed to a reference driving speed; and control an imaging unit to determine a size of a region of interest for an image to be captured by the imaging unit, based on a result of the comparing of the sensed driving speed to the reference driving speed.

The one or more processors may be further configured to control the imaging unit to: enlarge the region of interest, in response to the result of the comparing of the sensed driving speed to the reference speed being a determination that the sensed driving speed is higher than the reference driving speed; and reduce the region of interest, in response to the result of the comparing of the sensed driving speed to the reference speed being a determination that the sensed driving speed is lower than the reference driving speed.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
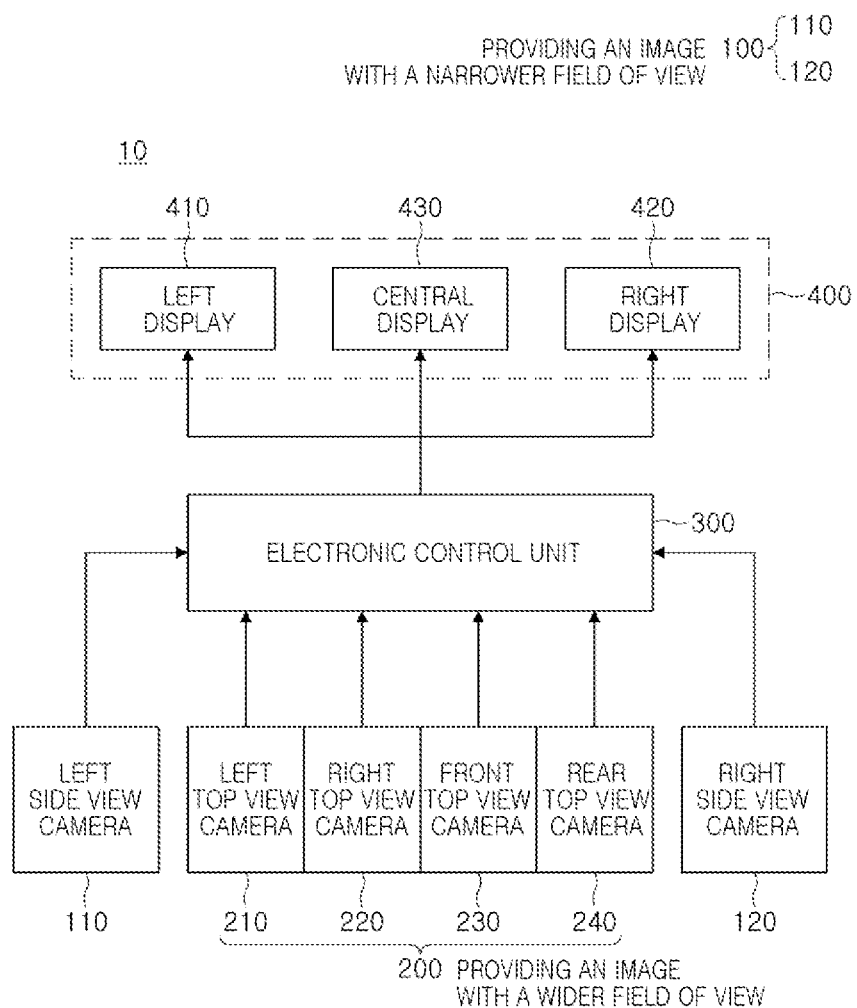
FIG. 1 is a block diagram of a camera system for a vehicle, according to an embodiment.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Herein, it is noted that use of the term "may" with respect to an example or embodiment, e.g., as to what an example or embodiment may include or implement, means that at least one example or embodiment exists in which such a feature is included or implemented while all examples and embodiments are not limited thereto.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as illustrated in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes illustrated in the drawings may occur. Thus, the examples described herein are not limited to the specific shapes illustrated in the drawings, but include changes in shape that occur during manufacturing.

The features of the examples described herein may be combined in various ways as will be apparent after an understanding of the disclosure of this application. Further, although the examples described herein have a variety of configurations, other configurations are possible as will be apparent after an understanding of the disclosure of this application.

FIG. 1 is a block diagram of a camera system 10 for a vehicle, according to an embodiment.

Referring to FIG. 1, the camera system 10 for a vehicle may include, for example, a side view camera apparatus 100, a top view camera apparatus 200, an electronic control unit (ECU) or electronic controller 300, and a display apparatus 400.

The side view camera apparatus 100 may include a left side view camera 110 configured to capture images in a left rear direction of the vehicle, and a right side view camera 120 configured to capture images in a right rear direction of the vehicle. Each of the left side view camera 110 and the right side view camera 120 may include a narrow angle camera that provides relatively high image quality and relatively high sense of distance.

The top view camera apparatus 200 may include a left top view camera 210 configured to capture images in a leftward direction of the vehicle, a right top view camera 220 configured to capture images in a rightward direction of the vehicle, a front top view camera 230 configured to capture images in a front direction of the vehicle, and a rear top view camera 240 configured to capture images in a rear direction of the vehicle.

As an example, the left top view camera 210, the right top view camera 220, the front top view camera 230, and the rear top view camera 240 may respectively capture images in respective downward directions, e.g., in respective ground-facing directions, from respective left, right, front, and rear external spaces of the vehicle.

Each of the left top view camera 210, the right top view camera 220, the front top view camera 230, and the rear top view camera 240 may include a wide angle camera.

The electronic control unit 300 may receive images output from the left side view camera 110 and the right side view camera 120, and images output from the left top view camera 210, the right top view camera 220, the front top view camera 230, and the rear top view camera 240, and may provide the received images to the display apparatus 400.

The electronic control unit 300 may generate information on driving of the vehicle and information on environment surrounding the vehicle. At least one sensor configured to detect a state of driving of the vehicle and a state of an environment surrounding the vehicle may be provided in the vehicle. The electronic control unit 300 may generate the information on the driving of the vehicle and the information on the environment surrounding the vehicle, based on sensing values output from the at least one sensor installed in the vehicle.

The electronic control unit 300 may control overall operations of the vehicle. For example, the electronic control unit 300 may include a body control module (BCM) configured to respectively control components constituting the body of the vehicle. For example, the body control module may control a wiper, a light, an electric seat, a sunroof, an air conditioning system, and the like of the vehicle.

The electronic control unit 300 may include a semiconductor processor that performs overall control of the left side view camera 110, the right side view camera 120, the left top view camera 210, the right top view camera 220, the front top view camera 230, and the rear top view camera 240.

The display apparatus 400 may include a left display 410, a right display 420, and a central display 430.

The electronic control unit 300 may provide an image received from the left side view camera 110 to the left display 410, and may provide an image received from the right side view camera 120 to the right display 420. For example, the electronic control unit 300 may convert the images received from the left side view camera 110 and the right side view camera 120 into electronic mirror images, and may provide the electronic mirror images to the left display 410 and the right display 420, respectively.

The electronic control unit 300 may provide images from the left top view camera 210, the right top view camera 220, the front top view camera 230, and the rear top view camera 240 to the central display 430.

For example, the electronic control unit 300 may synthesize images from the left top view camera 210, the right top view camera 220, the front top view camera 230, and the rear top view camera 240, to generate top view images, for example, such as a driver's view of the vehicle in a downward direction from a point in space above the vehicle, and may provide the generated top view image to the central display 430.

Figure 2:
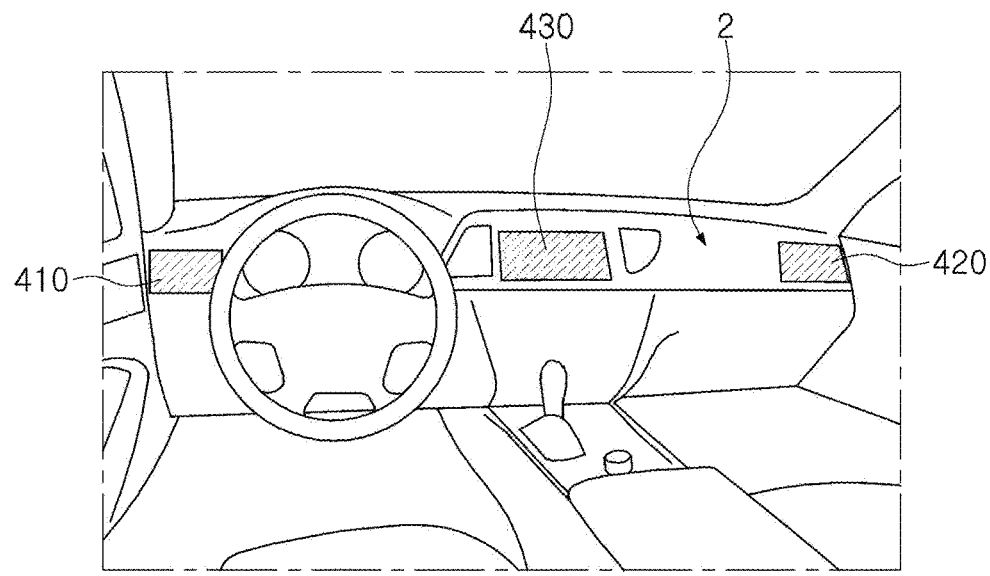
FIG. 2 is a view illustrating a display apparatus, according to an embodiment.

FIG. 2 is a view illustrating the display apparatus 400, according to an embodiment.

Referring to FIG. 2, the left display 410 and the right display 420 may be installed in left and right end portions of a dashboard 2 inside a vehicle, respectively, to output electronic mirror images, based on the left side view camera 110 and the right side view camera 120, respectively. Therefore, it may assist a driver to drive the vehicle while monitoring in rear leftward and rightward directions of the vehicle.

The central display 430 may be installed in a central portion of the dashboard 2, to output top view images, based on the left top view camera 210, the right top view camera 220, the front top view camera 230, and the rear top view camera 240. The central display 430 may output top view images, for example, such as a driver's view of the vehicle in a downward direction from a point in space above the vehicle, to assist the driver in driving the vehicle.

Figure 3:
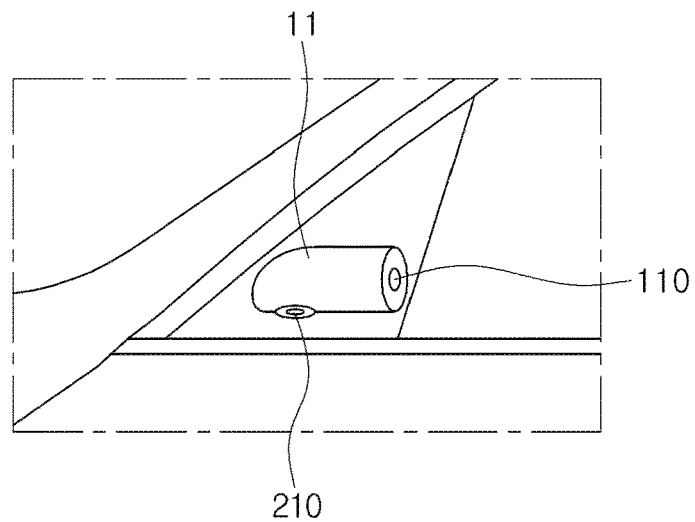
FIG. 3 is a view illustrating a left side view camera and a left top view camera, according to an embodiment.

FIG. 3 is a view illustrating the left side view camera 110 and the left top view camera, according to an embodiment.

Referring to FIG. 3, the left side view camera 110 and the left top view camera 210 may be respectively installed in a housing 11 mounted on a left external side of a vehicle. The left side view camera 110 may capture images in a rear direction from the left external side of the vehicle, and the left top view camera 210 may capture images in a downward direction from the left external side of the vehicle.

Similarly, a right side view camera 120 and a right top view camera 220 may be respectively installed in a housing mounted on a right external side of the vehicle. The right side view camera 120 may capture images in a rear direction from the right external side of the vehicle, and the right top view camera 220 may capture images in a downward direction from the right external side of the vehicle.

In addition, a front top view camera 230 and a rear top view camera 240 may be respectively installed on front and rear external sides of the vehicle, respectively, to capture images in a downward direction from front and rear external sides of the vehicle, respectively.

The left side view camera 110, the right side view camera 120, the left top view camera 210, the right top view camera 220, the front top view camera 230, and the rear top view camera 240 may be respectively mounted on the external sides of the vehicle.

The cameras 110, 120, 210, 220, 230, and 240, as a result of being mounted on the external sides of the vehicle, may easily deviate from a normal operating temperature due to a temperature of the vehicle itself, external direct sunlight, or the like. When a temperature of the cameras 110, 120, 210, 220, 230, and 240 deviates from the normal operating temperature, especially when a temperature of each of the cameras is higher than the normal operating temperature, there may be a problem that a dark current of an image sensor increases to deteriorate an image captured by the cameras 110, 120, 210, 220, 230, and 240. Therefore, it is necessary to appropriately control the cameras 110, 120, 210, 220, 230, and 240, depending on a driving situation of the vehicle, to reduce heat generation of the cameras.

Figure 4:
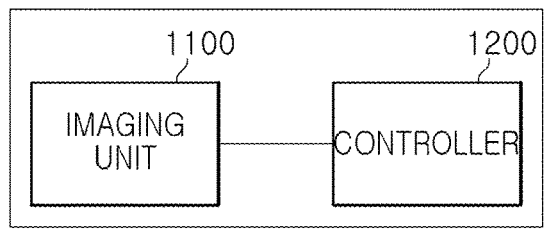
FIG. 4 is a block diagram of a camera for a vehicle, according to an embodiment.
Figure 5:
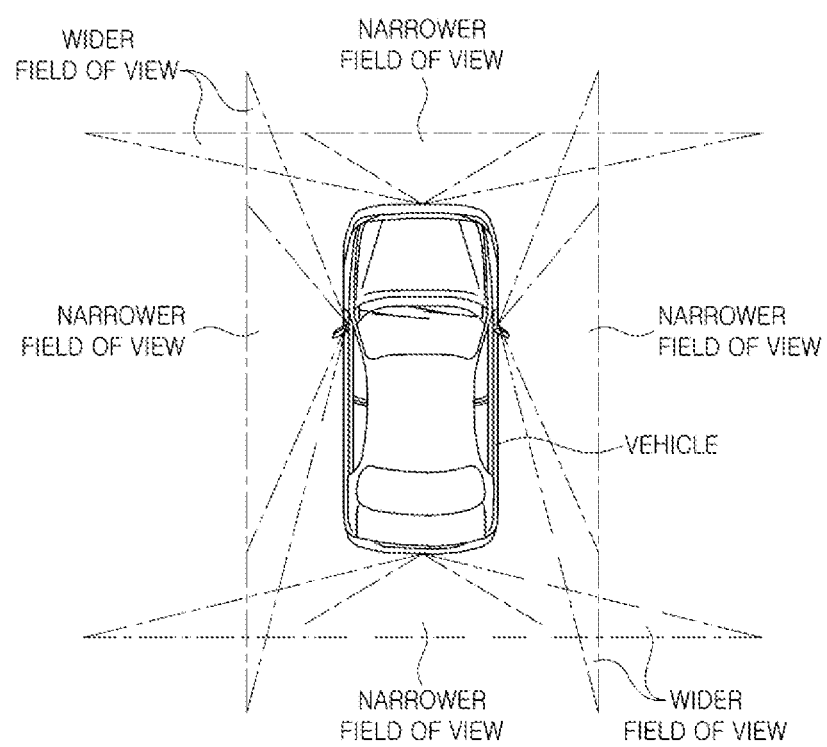
FIG. 5 illustrates examples of narrow and wide fields of view of the example camera system, according to an embodiment.

FIG. 4 is a block diagram of a camera 1000 for a vehicle, according to an embodiment.

Referring to FIG. 4, the camera 1000 may include, for example, an imaging unit (or imager) 1100 and a controller 1200.

The camera 1000 may correspond to the left side view camera 110, the right side view camera 120, the left top view camera 210, the right top view camera 220, the front top view camera 230, and the rear top view camera 240, illustrated in FIG. 1. Furthermore, the camera 1000 may be applied to various types of cameras that may be mounted on a vehicle.

The imaging unit 1100 may capture images of an exterior of the vehicle. For example, the imaging unit 1100 may include a lens and an image sensor provided below the lens. The image sensor converts light incident through the lens into an electrical signal. The image sensor may include a charge coupled device (CCD) or a complementary metal-oxide semiconductor (CMOS). As an example, the image sensor may include a plurality of pixels.

The imaging unit 1100 may set a predetermined region of interest (ROI), and may capture images of an object.

The controller 1200 may control an operation of the imaging unit 1100, according to information on driving of the vehicle and information on an environment surrounding the vehicle.

The controller 1200 may receive the information on driving of the vehicle and the information on the environment surrounding the vehicle, from the electronic control unit 300 of FIG. 1. For example, the controller 1200 and the electronic control unit 300 may be interconnected through an on-board diagnostics (OBD) port. The OBD port may be provided in a console or the like of the vehicle. The controller 1200 and the electronic control unit 300, to be interconnected through the OBD port, may perform controller area network (CAN) communications.

The controller 1200 may control the imaging unit 1100, depending on a driving speed of the vehicle, included in the information on driving of the vehicle. According to an embodiment, the controller 1200 may control the imaging unit 1100, depending on a gear position of the vehicle, included in the information on driving of the vehicle, and the controller 1200 may also control the imaging unit 1100, depending on the information on environment surrounding the vehicle from an illumination sensor and a rain sensor.

The controller 1200 may determine a region of interest of the imaging unit 1100, depending on a driving speed of the vehicle. When the driving speed is higher than a reference speed, the controller 1200 may enlarge a region of interest of the imaging unit, and when the driving speed is lower than the reference speed, the controller may reduce the region of interest of the imaging unit 1100.

The camera 1000 may enlarge a region of interest of the imaging unit 1100 to provide a wide field of view to a driver, when the driving speed is higher than a reference speed. In addition, the camera 1000 may reduce the region of interest of the imaging unit 1100 to reduce power consumption of the camera 1000, when the driving speed is lower than the reference speed. Therefore, heat generation of the camera 1000 may be reduced.

The controller 1200 may determine a dynamic range of the imaging unit 1100, depending on a driving speed of the vehicle. The dynamic range may refer to a range of brightness that an image sensor of the imaging unit 1100 may distinguish.

The controller 1200 may increase the dynamic range of the imaging unit 1100, when the driving speed is higher than a reference speed, and may reduce the dynamic range of the imaging unit 1100, when the driving speed is lower than the reference speed.

The camera 1000 may increase a dynamic range of the imaging unit 1100 to provide a clear image to a driver, when the driving speed is higher than a reference speed. In addition, the camera 1000 for a may reduce the dynamic range of the imaging unit 1100 to reduce power consumption of the camera 1000, when the driving speed is lower than the reference speed. Therefore, heat generation of the camera 1000 may be reduced.

The controller 1200 may activate a portion of pixels of an image sensor provided in the imaging unit 1100, and may deactivate remaining pixels of the image sensor, depending on a driving speed of the vehicle. The pixels to be activated may correspond to on-operation pixels, and the pixels to be deactivated may correspond to off-operation pixels. According to an embodiment, the activated pixels may have a preset reference resolution, and the deactivated pixels may have a resolution lower than the reference resolution.

The controller 1200 may control the pixels of the image sensor such that the number of pixels deactivated when the driving speed is higher than the reference speed is less than the number of pixels deactivated when the driving speed is lower than the reference speed. For example, the number of pixels activated when the driving speed is higher than the reference speed is greater than the number of pixels activated when the driving speed is lower than the reference speed.

The camera 1000 may increase the number of pixels to be activated when the driving speed is higher than the reference speed, to provide a clear image to the driver. In addition, the camera 1000 may reduce the number of pixels to be activated when the driving speed is lower than the reference speed, to reduce power consumption of the camera 1000. Therefore, heat generation of the camera 1000 may be reduced.

The controller 1200 may activate a portion of pixels of an image sensor provided in the imaging unit 1100, and may deactivate remaining pixels, depending on an adjacent distance between the vehicle and an object adjacent to the vehicle.

The controller 1200 may control the pixels of the image sensor such that the number of pixels deactivated when the adjacent distance is shorter than a reference distance, is less than the number of pixels deactivated when the adjacent distance is longer than the reference distance. For example, the number of pixels activated when the adjacent distance is shorter than the reference distance, is greater than the number of pixels activated when the adjacent distance is longer than the reference distance.

The camera 1000 may increase the number of pixels activated when an object is adjacent to the vehicle, to stably provide an image of the object adjacent to the driver. In addition, the camera 1000 may reduce the number of pixels that may be activated when an object is not adjacent to the vehicle, to reduce power consumption of the camera 1000. Therefore, heat generation of the camera 1000 may be reduced.

The controller 1200 may determine a frame rate of the imaging unit 1100, depending on a driving speed of the vehicle. The frame rate of the imaging unit 1100 may be understood as an output period of an image output from the imaging unit 1100.

The controller 1200 may increase the frame rate of the imaging unit, when the driving speed is higher than a reference speed, and may decrease the frame rate of the imaging unit 1100, when the driving speed is lower than the reference speed.

The camera 1000 may increase a frame rate of the imaging unit 1100, when the driving speed is higher than a reference speed, to stably provide seamless images to the driver. In addition, the camera 1000 may reduce the frame rate of the imaging unit 1100, when the driving speed is lower than the reference speed, to reduce power consumption of the camera 1000. Therefore, heat generation of the camera 1000 may be reduced.

According to embodiments disclosed herein, a camera for a vehicle may change operating conditions, depending on a driving state of the vehicle, to reduce heat generation of the camera.

The electronic control unit 300, the display apparatus 400, the left display 410, the right display 420, the central display 430, the imaging assembly 1100, and the controller 1200 in FIGS. 1 to 4 that perform the operations described in this application are implemented by hardware components configured to perform the operations described in this application that are performed by the hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A camera for a vehicle, comprising:
an imaging unit comprising:
a processor, configured to execute instructions;
a memory, configured to store the instructions that, when executed by the processor, configure the processor to image a region exterior to the vehicle; and
a controller configured to:
enlarge a region of interest of the imaging unit to provide a wider field of view in response to a driving speed of the vehicle being higher than a reference speed,
reduce the region of interest of the imaging unit to provide a narrower field of view in response to the driving speed being lower than the reference speed, and
activate a portion of pixels of an image sensor in the imaging unit, and deactivate a remaining portion of the pixels, depending on the driving speed.

2. The camera according to claim 1, wherein the controller is further configured to receive information on driving of the vehicle, including the driving speed, from an electronic control unit of the vehicle.

3. The camera according to claim 1, wherein, a number of pixels in the deactivated remaining portion of the pixels when the driving speed is higher than the reference speed is fewer than the number of pixels in the deactivated remaining portion of the pixels when the driving speed is lower than the reference speed.

4. The camera according to claim 1, wherein a resolution of the deactivated remaining portion of the pixels is lower than a resolution of the activated portion of the pixels.

5. The camera according to claim 1, wherein the controller is further configured to:
deactivate the remaining portion of the pixels, depending on an adjacent distance between the vehicle and an object adjacent to the vehicle.

6. The camera according to claim 5, wherein a number of pixels in the deactivated remaining portion of the pixels when the adjacent distance is shorter than a reference distance is fewer than the number of pixels in the deactivated remaining portion of the pixels when the adjacent distance is longer than the reference distance.

7. The camera according to claim 1, wherein the controller is further configured to
increase a frame rate of the processor in response to the driving speed being higher than a reference speed, and reduce the frame rate of the processor in response to the driving speed being lower than the reference speed.

8. The camera according to claim 1, wherein the controller is further configured to be connected to an electronic control unit of the vehicle through an on-board diagnostics port of the vehicle.

9. A camera for a vehicle, comprising:
an imaging unit comprising:
a processor, configured to execute instructions;
a memory configured to store the instructions that, when executed by the processor, configure the processor to image a region exterior to the vehicle; and
a controller configured to:
increase a dynamic range of the imaging unit in response to a driving speed of the vehicle being higher than a reference speed, wherein the dynamic range comprises a range of brightness that an image sensor of the imaging unit distinguishes, and
reduce the dynamic range of the imaging unit in response to the driving speed being lower than the reference speed.

10. The camera according to claim 9, wherein the controller is further configured to receive information on driving of the vehicle, including the driving speed, from an electronic control unit of the vehicle.

11. The camera according to claim 9, wherein the controller is further configured to
activate a portion of pixels of the image sensor in the imaging unit, and
deactivate a remaining portion of the pixels, depending on the driving speed.

12. The camera according to claim 11, wherein a number of pixels in the deactivated remaining portion of the pixels when the driving speed is higher than the reference speed is fewer than the number of pixels in the deactivated remaining portion of the pixels when the driving speed is lower than the reference speed.

13. The camera according to claim 11, wherein a resolution of the deactivated remaining portion of the pixels is lower than a resolution of the activated portion of the pixels.

14. The camera according to claim 9, wherein the controller is further configured to
activate a portion of pixels of the image sensor in the imaging unit, and
deactivate a remaining portion of the pixels, depending on an adjacent distance between the vehicle and an object adjacent to the vehicle.

15. The camera for a vehicle, according to claim 14, wherein a number of pixels in the deactivated portion of the pixels when the adjacent distance is shorter than a reference distance is fewer than the number of pixels in the deactivated portion of the pixels when the adjacent distance is longer than the reference distance.

16. The camera according to claim 9, wherein the controller is further configured to
increase a frame rate of the processor in response to the driving speed being higher than a reference speed, and
reduce the frame rate of the processor in response to the driving speed being lower than the reference speed.

17. The camera according to claim 9, wherein the controller is further configured to be connected to an electronic control unit of the vehicle through an on-board diagnostics port of the vehicle.

18. A control apparatus, comprising:
one or more processors configured to:
receive a sensed driving speed of a vehicle;

compare the sensed driving speed to a reference driving speed;

determine a size of a region of interest for an image to be captured by at least one imaging sensor, and enlarge the region of interest to provide a wider field of view of a driver in response to a determination that the sensed driving speed is higher than the reference driving speed, and dynamically activate and deactivate pixels of the imaging unit based on a determined driving speed of the vehicle.

19. The control apparatus of claim 18, wherein the one or more processors are further configured to control the imaging unit to:

reduce the region of interest to provide a narrower field of view, in response to a determination that the sensed driving speed is lower than the reference speed.

* * * * *